(12) United States Patent
Kool

(10) Patent No.: US 9,089,210 B2
(45) Date of Patent: Jul. 28, 2015

(54) SERVICE TROLLEY

(75) Inventor: Christiaan Kool, Willow Glen (ZA)

(73) Assignee: Christiaan Kool (ZA)

( * ) Notice: Subject to any disclaimer, the term of this patent is extended or adjusted under 35 U.S.C. 154(b) by 51 days.

(21) Appl. No.: 13/697,063

(22) PCT Filed: May 5, 2011

(86) PCT No.: PCT/IB2011/051997
§ 371 (c)(1),
(2), (4) Date: Nov. 9, 2012

(87) PCT Pub. No.: WO2011/141857
PCT Pub. Date: Nov. 17, 2011

(65) Prior Publication Data
US 2013/0057133 A1    Mar. 7, 2013

(30) Foreign Application Priority Data

May 10, 2010  (ZA) ................................. 2010/00861
Dec. 6, 2010  (ZA) ................................. 2010/08741

(51) Int. Cl.
| | | |
|---|---|---|
| *B62B 3/02* | (2006.01) | |
| *B62B 1/00* | (2006.01) | |
| *A47B 31/04* | (2006.01) | |
| *A47B 31/02* | (2006.01) | |

(52) U.S. Cl.
CPC ................. *A47B 31/04* (2013.01); *A47B 31/02* (2013.01); *B62B 3/02* (2013.01); *B62B 2202/67* (2013.01); *B62B 2204/02* (2013.01); *B62B 2204/06* (2013.01)

(58) Field of Classification Search
CPC .............. B62B 3/00; B62B 3/02; B62B 3/10; B62B 3/002; B62B 3/004; B62B 3/005; B62B 3/006; B62B 2202/67; B62B 2202/00; B62B 2202/52; B62B 2204/02; B62B 2204/06; A47B 31/02; A47B 31/04
USPC ............. 280/47.34, 29, 47.131, 47.17, 47.24, 280/47.26, 638, 639, 651, 35, 79.11, 79.3; 211/85.4, 150; 312/236, 249.8, 313, 312/314; 108/25, 26, 69, 77; 99/451, 481; 219/385, 386, 387, 391, 429, 450.1, 219/452.11
See application file for complete search history.

(56) References Cited

U.S. PATENT DOCUMENTS

| | | | | |
|---|---|---|---|---|
| 1,409,445 | A | * | 3/1922 | Hillyer et al. ................. 312/236 |
| 1,455,395 | A | * | 5/1923 | Exum .......................... 312/198 |
| 1,624,989 | A |   | 4/1927 | Smith et al. |
| 1,727,395 | A | * | 9/1929 | Coffey ......................... 126/268 |
| 1,955,203 | A | * | 4/1934 | Salomon ...................... 312/236 |
| 2,004,296 | A | * | 6/1935 | Royce .......................... 312/282 |
| 2,309,513 | A | * | 1/1943 | Kramer ........................ 219/387 |
| 2,439,133 | A | * | 4/1948 | Jenkins ........................ 219/218 |
| 2,520,543 | A | * | 8/1950 | Hawkins ...................... 219/386 |
| 2,602,716 | A | * | 7/1952 | Muth ............................. 108/77 |
| 2,900,045 | A | * | 8/1959 | Conklin et al. ................ 186/44 |
| 3,748,437 | A | * | 7/1973 | Keeshin et al. ............... 219/214 |
| 3,873,114 | A | * | 3/1975 | Brown .......................... 280/30 |
| 3,908,749 | A |   | 9/1975 | Williams |
| 3,915,529 | A | * | 10/1975 | Bernier ........................ 312/237 |

(Continued)

*Primary Examiner* — James M Dolak
(74) *Attorney, Agent, or Firm* — Ziolkowski Patent Solutions Group, SC

(57) ABSTRACT

The invention relates to a service trolley. The service trolley includes a tabletop having at least one stowable wing, wheels attached to the trolley for moving the trolley, and a hot plate integrated into the tabletop.

15 Claims, 4 Drawing Sheets

(56) References Cited

U.S. PATENT DOCUMENTS

| | | | |
|---|---|---|---|
| 4,508,959 A * | 4/1985 | Luscher | 219/385 |
| 4,706,817 A * | 11/1987 | Greathouse | 206/545 |
| 5,642,898 A * | 7/1997 | Wise | 280/652 |
| 6,302,097 B1 * | 10/2001 | Rivera | 126/38 |
| 6,474,677 B2 | 11/2002 | Kasuya | |
| 6,543,436 B2 * | 4/2003 | Montgomery | 126/38 |
| 6,575,155 B2 * | 6/2003 | Brennan | 126/41 R |
| 6,591,831 B2 * | 7/2003 | Reynolds | 126/33 |
| 7,172,231 B1 | 2/2007 | Johnson, II | |
| 7,536,868 B1 | 5/2009 | Ward | |
| 7,703,384 B2 * | 4/2010 | Annis et al. | 99/331 |
| 8,696,075 B1 * | 4/2014 | Rios | 312/237 |
| 8,857,346 B2 * | 10/2014 | Khanjian et al. | 108/26 |
| 8,931,293 B2 * | 1/2015 | Shei et al. | 62/258 |
| 2001/0052680 A1 | 12/2001 | Bennington | |
| 2002/0096509 A1 | 7/2002 | Von Mosshaim | |
| 2006/0244228 A1 | 11/2006 | Huguet | |
| 2009/0165771 A1 | 7/2009 | Selk | |

* cited by examiner

SERVICE TROLLEY

CROSS REFERENCE TO RELATED APPLICATIONS

The present application is a National Stage application of and claims priority to PCT Application PCT/IB2011/051997, filed on May 5, 2011, which claims priority to South African Provisional Patent Application 2010/00861, filed on May 10, 2010, and to South African Provisional Patent Application 2010/08741, filed on Dec. 6, 2010.

TECHNICAL FIELD

This invention relates to a service trolley.

BACKGROUND OF THE INVENTION

The inventor is aware of service trolleys used in the hospitality industry. Although, known trolleys, such as room service trolleys may include stowable wings and include a hotbox, this is usually ineffective and unpractical as the hotbox is located underneath the table to be dined at. The inventor is not aware of any trolleys that include a cold storage compartment, which could be used to keep foods and beverages cold. Known trolleys are only efficient in serving a one-course meal, thus the inventor identified a need to serve a three-course meal and beverages e.g. wine, by using a single service trolley that allows for cold and warm storage simultaneously. Food and beverages can thus be served at the required temperatures at the serving location.

BRIEF DESCRIPTION OF THE INVENTION

According to one aspect of the invention, there is provided a service trolley, which includes a tabletop having at least one stowable wing; wheels attached to the trolley for moving the trolley; and a hot plate integrated into the tabletop.

The service trolley may include a displaceable lid covering at least a portion of the hot plate.

The service trolley may include at least one storage compartment, for holding condiments, cutlery, wine, cold starters or the like.

The tabletop may include a rigid portion with a width of between 400 mm and 1000 mm. More particularly the rigid portion of the tabletop may have a width of between 400 mm and 600 mm. Advantageously the rigid portion of the tabletop may have a width to fit through a conventional door when the at least one stowable wing is in a stowed condition.

The service trolley may include at least one stowable wing attached to at least one side of the tabletop.

The service trolley may include at least one stowable wing which is hingedly attached to at least one side of the tabletop.

In one embodiment the at least one stowable wing may be foldable between a stowed condition in which it depend downwardly from at least one side of the tabletop and a deployed condition in which it is coplanar with the tabletop and contiguous with at least one side of the tabletop to extend the tabletop surface.

In another embodiment the at least one stowable wing may be slideable between a stowed condition in which it is retracted below the tabletop and a deployed condition in which it is coplanar with the tabletop and contiguous with at least one side of the tabletop to extend the tabletop surface.

In a particular embodiment the service trolley may include stowable wings on each side of the tabletop extending both the length and width of the tabletop when in a deployed condition.

The at least one stowable wing may have a width dimension of between 100 mm to 500 mm, to add an additional 200 mm to 1000 mm to the dimensions of the tabletop in a deployed condition.

The tabletop may include a lip along at least a portion of it's outer periphery to retain cutlery or crockery on the tabletop.

The service trolley may include a buffer along a portion of its periphery, in use to protect the periphery.

The service trolley may include an actuator connected to the at least one stowable wing for deploying the at least one stowable wing automatically.

The service trolley may include wing support structures for supporting the at least one stowable wing in its deployed condition. In one embodiment the wing support structures may be in the form of foldable struts. In another embodiment the wing support structures may be in the form of slidable stuts, arranged to slide coplanar with the tabletop. The struts may be slideable from below the tabletop.

The service trolley may include tubular guides from which the struts are telescopically extendible from a retracted condition in which the struts are retracted below the tabletop, to an extended condition in which the struts extend beyond the sides of the rigid portion of the tabletop.

Advantageously the stowable wings are easily altered from a stowed condition to a deployed condition and vice versa. In a deployed condition the service trolley may be used as a dinner table. The foldable wings may have a rounded periphery, and advantageously may serve as eating stations.

The wheels may be in the form of castor wheels and may be provided with integrated brakes.

In one embodiment the service trolley may have a rectangular shaped base. In this embodiment the wheels may be mounted on the base of the service trolley and may be in the form of two rigid castor wheels mounted on a first set of opposing sides, and two swivel castor wheels mounted on the other set of opposing sides. The wheels may be located towards a centre of the sides.

The hot plate may be in the form of an electrical hot plate or may include burners. Advantageously, an electrical hot plate will not pose a fire hazard. Advantageously the hot plate may be displaceable, to allow for cleaning beneath the hot plate. The hot plate may be hingedly attached on one side.

The displaceable lid may be in the form of a semi-cylindrical cover defining pivot points in the centre of each of the medians of the semi-circular lid ends. The displaceable lid may be removable. The service trolley may include an actuator connected to the displaceable lid for displacing the lid automatically.

The at least one storage compartment may be positioned below the tabletop. The at least one storage compartment may be in the form of any one of a lower support shelf and a cabinet or the like. The cabinet may include one or more storage drawers. The cabinet may be at least partially closed.

The at least one storage compartments may include a cold compartment. The at least one cold compartment may have a stainless steel lining or the like to hold ice. The al least one cold compartment may hold ice, a cold pack, a cold-storage body or a heat exchange element. The at least one cold compartment may be in the form of a fridge. Advantageously the cold compartment may be used to keep beverages cold.

The at least one storage compartment may be positioned on the tabletop and may include for use as a condiment holder or a cutlery holder. The at least one storage compartment may include a sealed enclosure defining a bucket which may be used as an ice bucket or wine cooler.

The at least one storage compartment may include a storage arrangement shaped and dimensioned to store dirty dishes.

The service trolley may include an actuator connected to the at least one storage compartment for moving the storage compartment automatically.

The at least one storage compartment may be removable.

The service trolley may include at least one displaceable rack. The at least one displaceable rack may be located above the hot plate for holding additional plates. The at least one displaceable rack may be shaped and dimensioned to fit underneath the displaceable lid, for keeping multiple plates warm.

The service trolley may be used for room service, serving of finger snacks, serving of meals and beverages, serving food and beverages at social functions/conferences or used for any form of catering.

The invention will now be described, by way of example only with reference to the following drawing(s):

BRIEF DESCRIPTION OF THE DRAWINGS

In the drawing(s)

DETAILED DESCRIPTION

Figure 1:
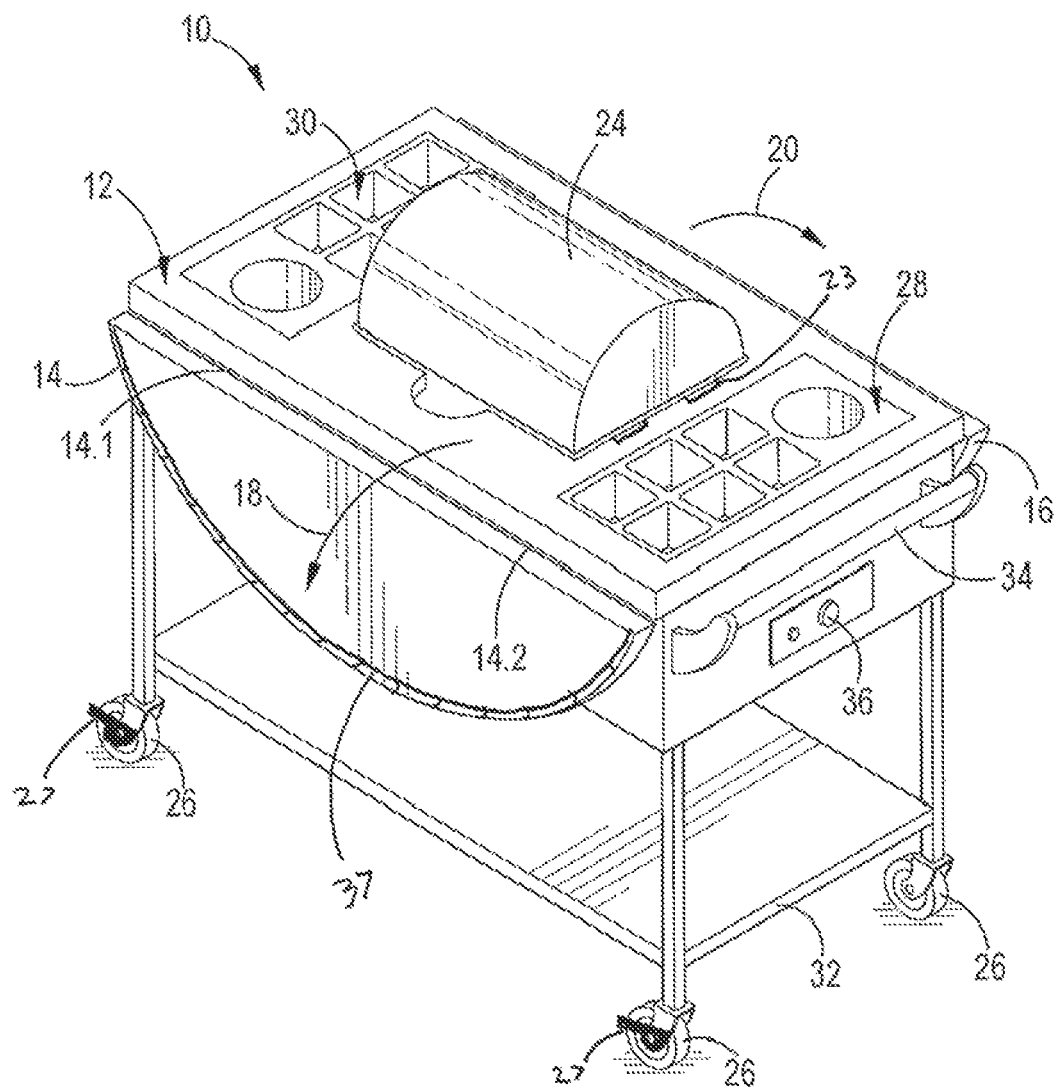
FIG. 1 shows a three-dimensional drawing of one embodiment of a trolley in a stowed condition.

In FIG. 1 a service trolley 10, of one embodiment of the invention, is shown.

The trolley includes a rigid tabletop 12 and two stowable wings 14, 16. The rigid tabletop 12 has a width of 700 mm so as to fit through a conventional door. The two stowable wings 14, 16 include hinges 14.1, 14.2, 16.1, 16.2 (only 14.1 and 14.2 are visible) so that the wings are hingedly displaceable downwardly in the direction of arrows 18, 20.

Figure 2:
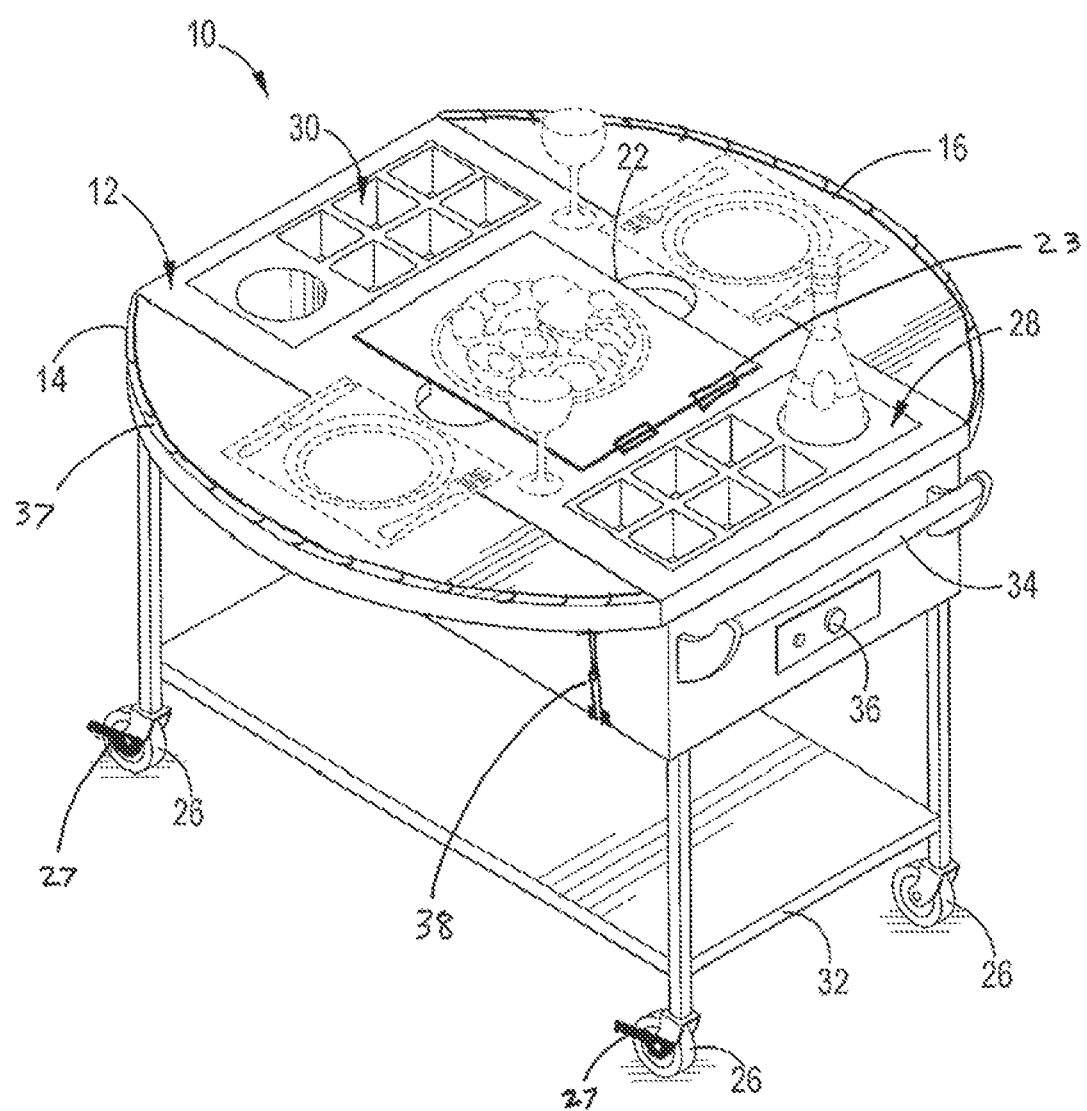
FIG. 2 shows a three-dimensional drawing of the trolley in FIG. 1, in a deployed condition.

The trolley also includes an electrical hot plate 22 (see FIG. 2) integrated into the tabletop 12. The hot plate 22 may have hinges 23 attached to one side of the hot plate 22 so that the hot plate 22 is hingedly attached to the tabletop 12. In FIG. 1, a displaceable lid 24 is shown. The lid 24 is in the form of a semi-cylindrical cover defining pivot points (not shown) in the centre of each of the medians of the semi-circular lid ends. The lid 24 is rotatable between an open condition (see FIG. 2) and a closed condition (see FIG. 1). In one embodiment, the displaceable lid 24 includes an actuator connected to the displaceable lid 24 for displacing the lid 24 automatically.

The trolley includes castor wheels 26 which have integrated brakes 27.

The trolley includes holders 28, 30 with dividers to define cutlery holders, condiment holders and a wine bottle holder.

The trolley 10 is provided with a handle 34 for ease of movement by hand. Furthermore, the trolley 10 includes a thermostat control 36, electrically connected to the hot plate 22. The thermostat control 36 includes a rotary temperature adjustment knob and an indicator light.

In use, as can be seen in FIG. 1, the wings are folded downwardly to a stowed condition and the lid 24 is closed to keep food on the hotplate 22 warm. The trolley can then be moved to where the food is to be served, and if necessary, the hot plate 22 is connected to an electric power outlet. The wings 14, 16 are then deployed by moving the wings in the opposite direction to arrows 18, 20. In one embodiment, the stowable wings 14, 16 are slideable between a stowed condition in which they are retracted below the tabletop 12 and a deployed condition in which they are coplanar with the tabletop 12 and contiguous with a respective side of the tabletop 12 to extend the tabletop surface. In another embodiment, the stowable wings 14, 16 include a lip 37 along at least a portion of their outer periphery to retain cutlery or crockery on the tabletop 12.

The wings are supported in their deployed condition by support structures in the form of support struts. In one embodiment, wing support structures are in the form of foldable struts 38 (see FIG. 2). In another embodiment the struts are slideable from below the rigid tabletop 12. An actuator may be connected to a stowable wing 14, 16 for deploying the stowable wing 14, 16 automatically.

The trolley includes a storage arrangement in the form of a lower shelf 32 for storing dirty dishes.

Figure 3:
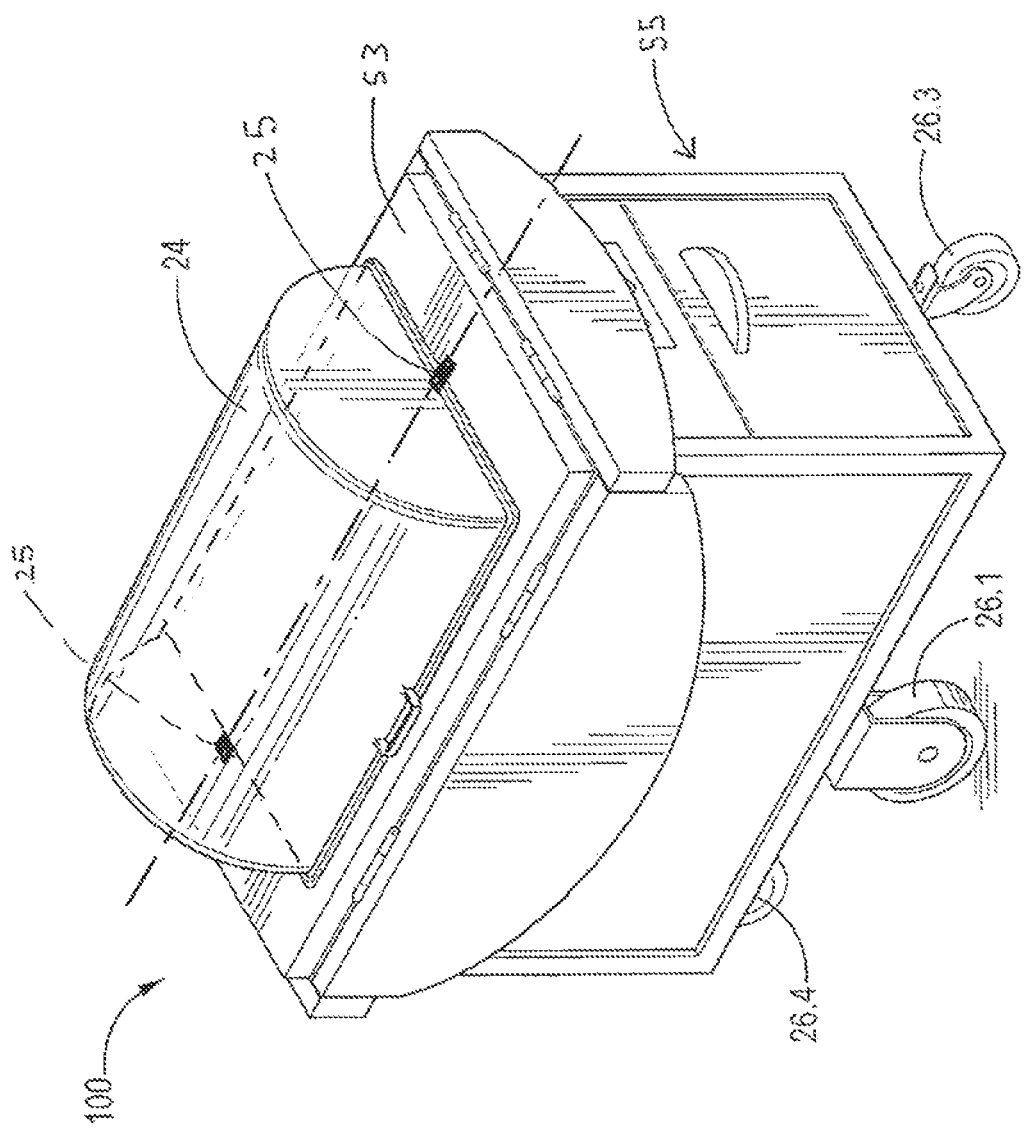
FIG. 3 shows a three-dimensional drawing of another embodiment of a trolley in stowed condition.
Figure 4:
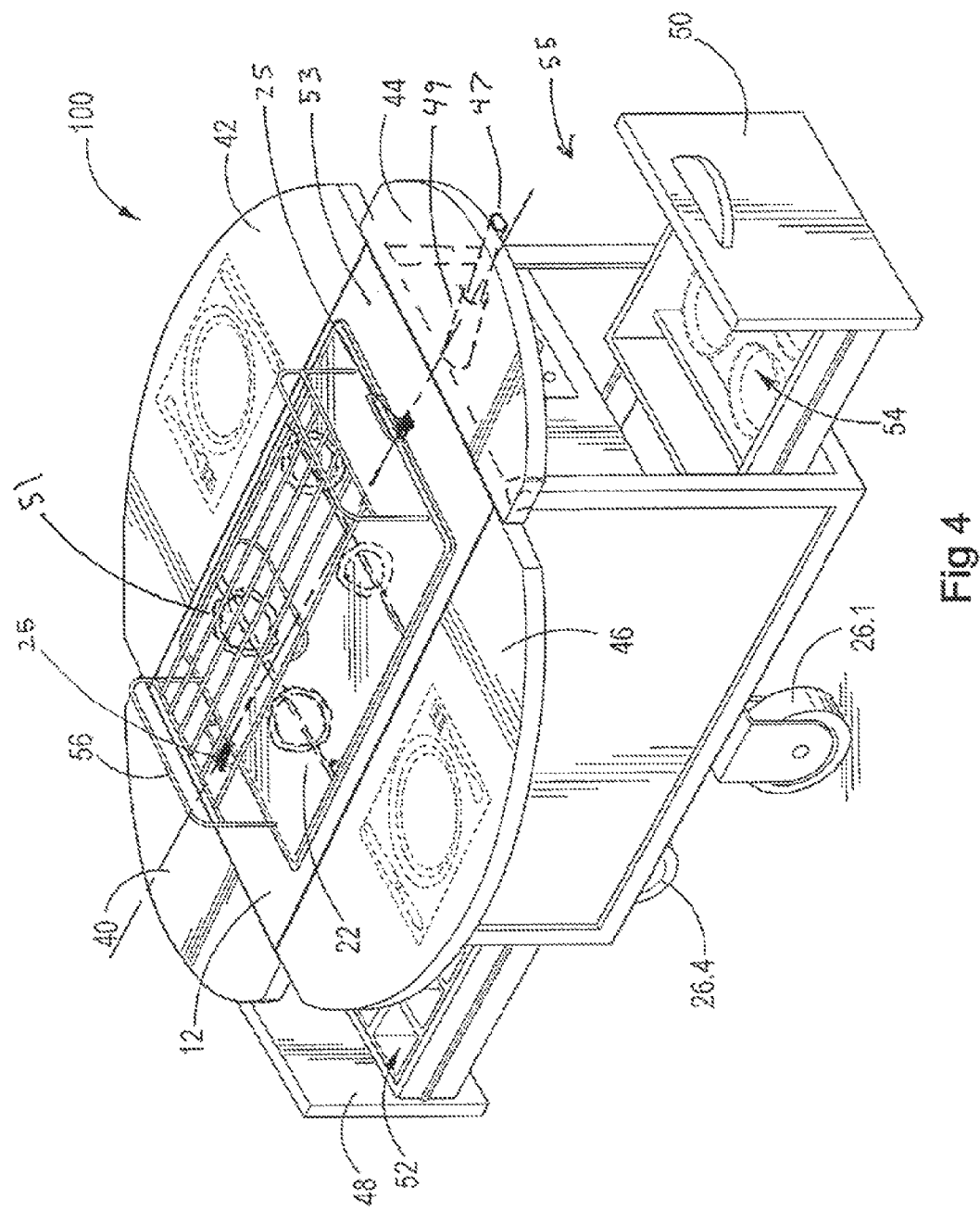
FIG. 4 shows a three-dimensional drawing of the trolley in FIG. 3, in a deployed condition.

In FIGS. 3 and 4 a service trolley 100, of another embodiment of the invention, is shown. For illustrative purposes, the numbering for the same and similar parts are the same as those used in FIG. 1 and FIG. 2. In this embodiment the trolley 100 includes a rigid tabletop 12 and includes foldable wings 40, 42, 44, 46 on the four sides of the tabletop 12 extending both the length and width of the tabletop 12 while in a deployed condition (as shown in FIG. 4). Slideable struts 47 may be arranged to slide coplanar with the tabletop 12 from below the tabletop 12. In one embodiment, the service trolley includes tubular guides 49 from which the slideable struts 47 are telescopically extendible from a retracted condition in which the slideable struts 47 are retracted below the tabletop 12, to an extended condition in which the slideable struts 47 extend beyond the sides of the rigid portion of the tabletop 12. The trolley also includes an electrical hot plate 22 integrated into the tabletop 12. In another embodiment, the service trolley 100 may have a hot plate 22 that includes burners 51. In another embodiment (not shown) the wings 40, 44 form a rigid portion of the tabletop. The service trolley 100 may also have a tabletop 12 which includes a buffer 53 along a portion of its periphery.

The trolley includes wheels 26 attached to the trolley, for moving the trolley. The wheels 26 are in the form of two rigid castor wheels 26.1, 26.2 (not visible) mounted centrally on a first set of opposing sides, and two swivel castor wheels 26.3, 26.4 mounted centrally on the other set of opposing sides. The wheel configuration allows the trolley to be steered and rotated about a central rotational axis.

In one embodiment, storage compartments are positioned below the tabletop 12 and are in the form of a cabinet 55. The trolley 100 includes cabinets 55 having two storage drawers 48, 50. The storage drawers 48, 50 include cold compartments 52, 54 (see FIG. 4) made of stainless steel, and which can hold ice, a cold pack, a cold-storage body or a heat exchange element. Storage compartments include cold compartments 52, 54 to keep beverages and food cold. In yet another embodiment (not shown), the trolley includes three or more storage drawers. In one embodiment, a storage compartment includes a sealed enclosure defining a bucket.

The trolley 100 includes a removable rack 56 that is located above the hot plate 22, for storing additional plates. The rack 56 fits underneath the displaceable lid 24, and can keep additional plates warm. The lid 24 is in the form of a semi-cylindrical cover defining pivot points 25 in the centre of each of the medians of the semi-circular lid ends. The lid 24 is rotatable between an open condition (see FIG. 4) and a closed condition (see FIG. 3).

The hot plate 22, displaceable lid 24 and storage drawers 48, 50 are all removable to allow for the cleaning of the trolley.

The inventor believes that the invention, as described and illustrated provides a new service trolley, which will ease the serving of food to patrons at locations removed from a location where the food is prepared. The inventor further believes that the invention will provide a manner to serve a three-course meal and beverages, by using a single service trolley that allows for cold and warm storage simultaneously and also facilitates independent dining.

The invention claimed is:

1. A service trolley, which includes:
   a tabletop having at least one stowable wing, contiguously attached to one side of the tabletop, the wing hingedly foldable between a stowed condition in which the at least one stowable wing descends downwardly from at least one side of the tabletop and a deployed condition in which the at least one stowable wing is coplanar with the tabletop to extend the tabletop surface;
   wing support structures for supporting the at least one stowable wing in its deployed condition;
   wheels attached to the trolley for moving the trolley; and
   an electrical hot plate integrated into the tabletop.

2. A service trolley as claimed in claim 1, in which the service trolley includes at least one storage compartment.

3. A service trolley as claimed in claim 1, which includes stowable wings on each side of the tabletop extending both the length and width of the tabletop when in a deployed condition.

4. A service trolley as claimed in claim 1, in which the at least one stowable wing includes a lip along at least a portion of its outer periphery to retain cutlery or crockery on the tabletop.

5. A service trolley as claimed in claim 1, in which the wing support structures are in the form of foldable struts.

6. A service trolley as claimed in claim 1, in which the wing support structures are in the form of slideable struts, arranged to slide coplanar with the tabletop from below the tabletop.

7. A service trolley as claimed in claim 6, in which the service trolley includes tubular guides from which the struts are telescopically extendible from a retracted condition in which the struts are retracted below the tabletop, to an extended condition in which the struts extend beyond the sides of the rigid portion of the tabletop.

8. A service trolley as claimed in claim 1, in which the wheels are in the form of castor wheels provided with integrated brakes.

9. A service trolley as claimed in claim 8, in which the service trolley has a rectangular shaped base and, in which the wheels are mounted on the base of the service trolley and are in the form of two rigid castor wheels mounted on a first set of opposing sides, and two swivel castor wheels mounted on the other set of opposing sides.

10. A service trolley as claimed in claim 1, in which the hot plate is displaceable and hingedly attached to the tabletop on one side of the hot plate.

11. A service trolley as claimed in claim 2, in which the at least one storage compartment is positioned below the tabletop and in which the at least one storage compartment is in the form of a lower support shelf or a cabinet.

12. A service trolley as claimed in claim 2, in which the at least one storage compartments includes a cold compartment.

13. A service trolley as claimed in claim 12, in which the cold compartment is in the form of a fridge.

14. A service trolley as claimed in claim 2, in which the at least one storage compartment is positioned on the tabletop.

15. A service trolley as claimed in claim 1, in which the service trolley includes at least one displaceable rack, located above the hot plate and being shaped and dimensioned to fit underneath the displaceable lid, for keeping multiple plates warm.

* * * * *

UNITED STATES PATENT AND TRADEMARK OFFICE
CERTIFICATE OF CORRECTION

| | |
|---|---|
| PATENT NO. | : 9,089,210 B2 |
| APPLICATION NO. | : 13/697063 |
| DATED | : July 28, 2015 |
| INVENTOR(S) | : Kool |

It is certified that error appears in the above-identified patent and that said Letters Patent is hereby corrected as shown below:

In the Claims

Col. 5, line 18 (Claim 1), delete "from at least" and substitute therefore -- from the --; and Col. 5, line 25 (Claim 1), delete "tabletop." and substitute therefore -- tabletop; wherein the service trolley further includes a displaceable lid covering at least a portion of the hot plate, in which the displaceable lid is in the form of a semi-cylindrical cover defining pivot points in a center of each of the medians of the semi-circular lid ends, such that the lid is rotatable about the pivot points, between an open condition in which the lid is stowed below the hot plate and a closed condition in which the lid covers at least a portion of the hot plate. --.

Signed and Sealed this
Twenty-ninth Day of December, 2015

Michelle K. Lee
*Director of the United States Patent and Trademark Office*